United States Patent [19]
Bernhardt et al.

[11] Patent Number: 4,875,405
[45] Date of Patent: Oct. 24, 1989

[54] SEALING DEVICE

[75] Inventors: Bruno Bernhardt, Reutlingen; Heinrich Kedzierski, Wennigsen, both of Fed. Rep. of Germany

[73] Assignee: WABCO Westinghouse Steuerungstechnik GmbH, Hanover, Fed. Rep. of Germany

[21] Appl. No.: 73,592

[22] Filed: Jul. 15, 1987

[30] Foreign Application Priority Data

Jul. 16, 1986 [DE] Fed. Rep. of Germany ....... 3623928

[51] Int. Cl.⁴ .................................................. F16J 1/06
[52] U.S. Cl. ......................................... 92/194; 92/201; 92/240; 92/255; 92/258; 277/165; 277/198
[58] Field of Search ............... 277/165, 75, 70, 71, 277/215, 198, 199, 165, 138, 142, 143; 92/148, 149, 182, 240, 243, 242, 244, 257, 253, 251, 193, 194, 256, 195, 245, 201, 255, 258

[56] References Cited

U.S. PATENT DOCUMENTS

| | | | |
|---|---|---|---|
| 1,595,305 | 8/1926 | Kibelt | 92/244 |
| 2,175,441 | 10/1939 | Miller | 92/244 |
| 2,470,541 | 5/1949 | Young | 92/257 |
| 2,596,516 | 5/1952 | Wellington | 92/243 |
| 2,701,172 | 2/1955 | Koester | 92/194 |
| 2,772,931 | 12/1956 | Biedermann | 92/243 X |
| 2,814,540 | 11/1957 | Southerwick | 92/194 |
| 2,815,992 | 12/1957 | Rodgers | 92/251 X |
| 2,914,369 | 11/1959 | Hayman | 92/240 |
| 2,935,365 | 5/1960 | Dega | 277/165 |
| 2,994,571 | 8/1961 | Peras . | |
| 3,092,427 | 6/1963 | Sadler et al. | 92/240 X |
| 3,136,228 | 6/1964 | Dailey | 92/243 X |
| 3,149,848 | 9/1964 | Calloway | 277/165 |
| 3,185,042 | 5/1965 | Hastings | 92/253 X |
| 3,282,596 | 11/1966 | Wood et al. . | |
| 3,354,794 | 11/1967 | Dailey | 92/253 X |
| 3,565,446 | 2/1971 | Nybers | 92/182 X |
| 3,603,215 | 9/1971 | Leschisin | 92/182 |
| 3,678,809 | 7/1972 | Doutt | 92/244 X |
| 3,814,445 | 6/1974 | Bitzan | 277/165 |
| 4,053,166 | 10/1977 | Domkowski | 277/165 X |
| 4,151,999 | 5/1979 | Ringel et al. | 277/165 |
| 4,294,164 | 10/1981 | Stoll | 92/251 X |
| 4,484,512 | 11/1984 | Dechavanne | 92/249 X |

FOREIGN PATENT DOCUMENTS

| | | |
|---|---|---|
| 31052 | 7/1981 | European Pat. Off. . |
| 827369 | 1/1952 | Fed. Rep. of Germany ...... 277/165 |
| 1742250 | 3/1957 | Fed. Rep. of Germany . |
| 1475772 | 12/1969 | Fed. Rep. of Germany . |
| 2432181 | 1/1976 | Fed. Rep. of Germany ...... 277/165 |
| 2458974 | 6/1976 | Fed. Rep. of Germany . |
| 2536759 | 2/1977 | Fed. Rep. of Germany ........ 92/249 |
| 3315050 | 11/1983 | Fed. Rep. of Germany . |
| 8519534 | 10/1985 | Fed. Rep. of Germany . |
| 3442463 | 5/1986 | Fed. Rep. of Germany . |
| 2379971 | 9/1978 | France . |
| 2444206 | 7/1980 | France . |
| 449354 | 4/1968 | Switzerland . |
| 734691 | 8/1955 | United Kingdom ................ 277/165 |
| 887053 | 1/1962 | United Kingdom .................. 92/243 |
| 2073845 | 10/1981 | United Kingdom . |

Primary Examiner—Allan N. Shoap
Attorney, Agent, or Firm—J. O. Ray, Jr.

[57] ABSTRACT

A sealing device particularly suitable for sealing pistons of working cylinders and for sealing two machine components which can slide against one another is disclosed. A conventional sealing element consisting of low-friction, but not very elastic material, such as PTFE plastic material, and resting on an elastic support, is used. The cross-section of the sealing element in a direction of the sliding motion is U-shaped and encircles the support. The dimensions of the support and the sealing element are determined such that the support exerts prestress forces on the sealing element which try to bend the rim areas of the sealing element outward against the sliding surface for the sealing element. Consequently, an additional force component, directed toward the sliding surface, results for the pressure force which is exerted on the sealing element by the support and functions as a sealing force.

24 Claims, 1 Drawing Sheet

SEALING DEVICE

FIELD OF THE INVENTION

The present invention relates, in general, to sealing devices and, more particularly, the invention relates to an apparatus for sealing two machine components, at least one of such two machine components being movable relative to the other, such as, the piston of a working cylinder.

BACKGROUND OF THE INVENTION

Prior to the present invention, sealing devices of this kind, which are useful in sealing the piston of a working cylinder, have been disclosed in the art. See, for example, German Pat. No. DE 33 15 050 A1. This particular sealing device makes use of the excellent sliding and sealing properties of the PTFE plastic material, more commonly known as Teflon, for the sealing element. However, since this material, when used as the sealing element, is not sufficiently elastic, an elastic O-ring, installed in a groove of the piston, is used as an elastic support element to generate the necessary elastic pressure force for the sealing element and to ensure a sufficient seal. The sealing element in this prior art cylinder is constructed as a sleeve-shaped ring which rests directly on the elastic support. The center section of the sealing element is slightly bulged due to the pressure force of the support which is directed outward unto the sliding surface of the cylinder and functions as the sealing force so that a contact surface results. The dimensions of the contact surface remain undefined. An additional disadvantage of this device, known to the art, resides in the fact that the support must have some clearance in an axial direction within the groove holding it to allow for the change in the volume of the support as necessary for generating the elastic sealing force. A clearing of this kind, however, also signifies that the axial position of the support is not defined, or that the support acquires an undesirable axial mobility within the groove which hinders the exact positioning of the piston.

The disadvantages mentioned above, in relation to the device known to the art, can be avoided if a different sealing principle is applied, such as known from German Pat. No. DE 24 58 974 A1. In this device, known to the art, the piston in a working cylinder is encircled and sealed by a rubber cup packing. The packing of this seal, known to the art, advantageously forms two sealing edges which, due to their elastic material and the prestress resulting from it, are pressed against the sliding surface of the working cylinder. It is conceivable to coat this seal, known to the art, with a layer of PTFE plastic or a similar material with excellent sliding properties. However, a solution of this kind would cause design and production problems without assuring a sufficiently high elastic pressure force for the sealing edges.

SUMMARY OF THE INVENTION

The present invention teaches a sealing apparatus for sealing two machine components which can slide against one another. One of these components has a sliding surface along which the other component slides with a sealing element attached to it. The sealing element consists of a plastic material having low-friction and relatively low elasticity, such as PTFE. A support is provided for attaching at least a portion of the sealing element, which slides along the sliding surface of the other component, and to provide a requisite amount of support for the sealing element. The support is constructed in such a manner that it will exhibit elasticity in a plane vertical to or more or less vertical to the sliding surface. The portion of the sealing element which slides along the sliding surface is constructed in such a way that it encircles the support in a direction of the sliding motion. Mounting protrusions of the sealing element, which extend in a plane vertical to or more or less vertical to the sliding surface, rest against corresponding support surfaces of the support which are also oriented in a plane vertical to or more or less vertical to the sliding surface. When the sealing element and the support are not mounted the outer distance of the support surfaces, measured in a direction of the sliding motion, is greater than the distance between the mounting protrusions of the sealing element. The portion of the sealing element which slides along the sliding surface is constructed such that it tries, under the influence of the prestress exerted by the support surfaces on the mounting protrusions, to bend upward toward the sliding surface at least in the area of such mounting protrusions.

OBJECTS OF THE INVENTION

It is, therefore, one of the primary objects of the present invention to provide a sealing apparatus which can advantageously utilize the properties of an excellent but essentially non-elastic sliding material.

Another object of the present invention is to provide a sealing apparatus in which a prestress exerted on the sealing element by a support, when installed and mounted, will cause a pressure force directed toward the sliding surface for the portion of the sealing element in sliding engagement with the sliding surface thereby generating a maximum sealing force at the free ends of the sealing element while the sealing force gradually diminishes in the center of the sealing element so that a sufficiently definable sealing edge is also obtained.

Still another object of the present invention is to provide a sealing apparatus which can control and seal a relatively long sealing edge on a flat or wavy sealing surface.

Yet another object of the present invention is to provide a sealing apparatus which can be used as a single-lip sealing element as well as a double-lip sealing element.

These and various other objects and advantages of the sealing apparatus of the present invention will become more readily apparent to those persons who are skilled in the sealing art from the following more detailed description when such description is taken in conjunction with the attached drawings and with the appended claims.

BRIEF DESCRIPTION OF THE INVENTION

In each of the views, illustrating the sealing apparatus of the present invention, identical numerals have been used to designate identical elements of the invention.

Although the invention is not limited thereto, it will, for the purposes of illustration only, be described as it relates to a working cylinder for which the invention has excellent utility.

Figure 1:
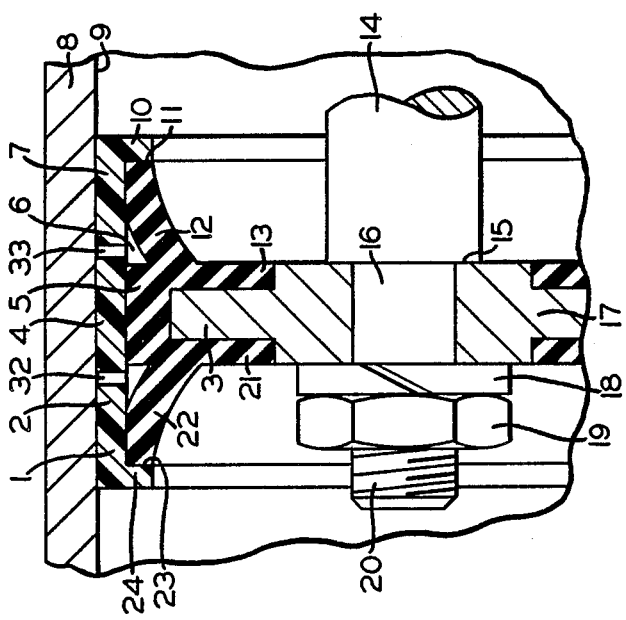
FIG. 1 is a fragmented cross-sectional view of one presently preferred embodiment of the sealing apparatus constructed according to the present invention.

Now refer more particularly to FIG. 1, which shows a section of a working cylinder containing a sealed piston to which pressurized air can be applied. As illustrated therein, a cylinder tube 8 has in its interior a sliding surface 9 for the piston which is attached to a piston rod 14. The piston consists of a rigid mount 17, for example, of metal, a support 5 attached on top of the mount 17, and a sealing element 2.

The mount 17 is pushed unto the tapered end 16 of the piston rod 14 in such a way that it rests against the shoulder 15 of the piston rod 14. A nut 19 for securing and attaching the mount 17 is screwed unto a thread 20 at the end of the piston rod 14. A spring washer 18 is inserted between the nut 19 and the mount 17. In a manner not shown by the drawing, the mount 17 is so attached that it cannot be turned in relation to the piston rod 14. Furthermore, the mount 17 is attached to the piston rod 14 and sealed, which is not shown in the drawing. A sealing ring placed between the mount 17 and the piston rod 14, for example, may be used for this purpose.

The mount 17 is constructed as a perforated disk and is thinner in the area of the outer rim than in the center. The outer rim area 3 carries the support 5, which consists of rubber or a similarly elastic material. The support 5, is equipped with two ring-shaped protrusions 13 and 21 which are pointing inward and with which the support 5 encircles the outer rim area 3 of the mount 17. The support 5 is attached to the mount 17 in a way not shown by the drawing (for example, by adhesive). Furthermore, the support 5 is equipped with two sleeve-shaped protrusions 12 and 22 which extend more or less into the direction of the sliding motion.

The support 5, described above, is encircled in the direction of the sliding motion by the sealing element 2 which has a U-shaped cross-section in the sliding direction and vertical to the sliding surface 9, i.e., in the plane of FIG. 1. The two sides of the U are formed by the two ring-shaped inward-pointing protrusions 10 and 24 of the sealing element 2. The inner surfaces of the two protrusions 10 and 24 of the sealing element 2, which extend in a plane vertical to or more or less vertical to the sliding surface 9, rest against the outer end surfaces of the support's 5 protrusions 12 and 22 which thus serve as support surfaces 11 and 23.

The sealing element 2 consists of a material having very low friction, such as PTFE plastic material, which however, is also of relatively low elasticity. In order to obtain a sufficiently strong seal between the piston and the sliding surface, even after prolonged operation and possibly showing wear, the sealing element 2 has to be pressed against the sliding surface 9 under the effect of elastic prestress. The material of the sealing element 2 alone cannot generate this prestress (elasticity) or cannot generate it in sufficient strength. For this reason, the sealing element 2 is supported by the elastically-constructed support 5. The two protrusions 12 and 22 of the support 5 are constructed and proportioned in such a way that they exert a predetermined elastic prestress force on the end areas of the sealing element 2. In addition to this prestress force, generated by the elasticity of the support 5 which works in a plane vertical to or more or less vertical to the sliding surface 9, the sealing device shown makes it possible to generate an additional component of prestress force which works in the direction of the sliding surface 9 with the aid of the following measures.

The outer distance of the support surfaces 11 and 23 has been proportioned in such a way that when the sealing element 2 and the support 5 are not mounted it is slightly greater than the inner distance between the protrusions 10 and 24 of the sealing element 2. This means that the sealing element 2 has to be clamped unto the support 5 when the device described is being assembled. After assembly, therefore, the protrusions 12 and 22 of the support 5, with the aid of the support surfaces 11 and 23, exert a force on the protrusions 10 and 24 of the sealing element 2 which force is more or less oriented in the direction of the sliding motion and would, in the absence of the support function of the sliding surface 9, cause the ends 7 and 1 of the sealing element 2 to be widened or bent out, respectively.

When the piston is mounted in the cylinder the sealing element 2 rests against the sliding surface 9 in such a way that the sealing element 2 cannot be widened. Nevertheless, the sealing element 2 remains under the effect of a corresponding prestress which tries to widen or bend the sealing element 2 outward in the area of the protrusions 10 and 24 or in the end areas 1 and 7 while the forces of the protrusions 12 and 22 are applied to the protrusions 10 and 24 in the manner of levers. This means that in addition to the normal elastic pressure force which is addition to the normal elastic pressure force which is exerted on the sealing element 2 by the protrusions 12 and 22 an additional pressure force results from the "widening effect" described above. The result is a pressure force exerted on the sealing element 2 in a direction of the sliding surface 9 that functions as a sealing force which reaches a maximum in the end areas 1 and 7 of the sealing element 2 and steadily decreases toward the center 4 of the sealing element 2. In this manner, the center section of the support 5, as seen in the direction of the sliding motion, does not exert any or at least not any significant pressure force on the sealing element 2.

The space 6 existing in the central area of the piston construction, described above, between the ends 1 and 7 of the sealing element 2, which function as sealing edges, for example, can be bled in a way not shown, in order to produce a pressure gradient between the chambers of the working cylinder to which pressurized air can be applied and the above-named central area of the piston.

Figure 2:
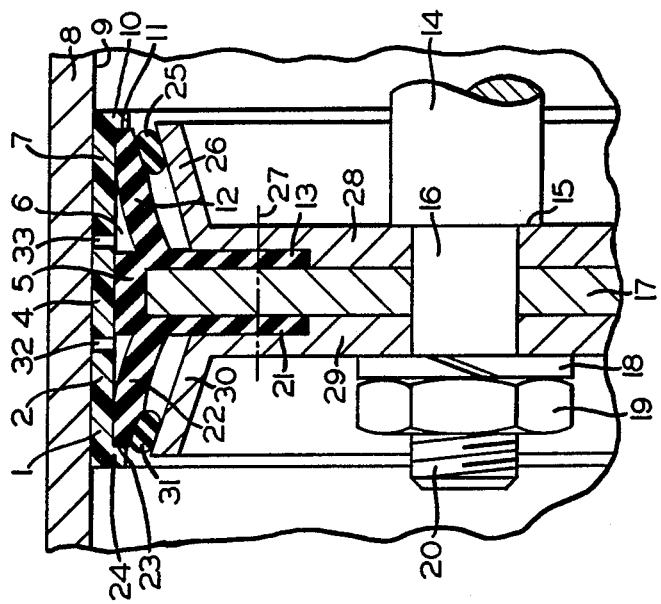
FIG. 2 is a fragmented cross-sectional view of an alternative embodiment of a sealing apparatus constructed according to the present invention.

Now refer to FIG. 2, which shows a refinement of the device represented in FIG. 1, for example, for application in hydraulic systems. In addition to the components of the device represented in FIG. 1, the sealing device, according to FIG. 2, has two rigid support elements 28 and 29, for example, made of metal. These support elements 28 and 29 are attached on the piston rod 14 or to the piston by pushing them unto the tapered end 16 of the piston rod 14, like the mount 17, and by placing them on both sides of the mount 17.

The support elements 28 and 29 are attached to the mount 17 by not specifically defined means of attachment in such a way that the protrusions 13 and 21 of the support 5 are located between the support elements 28 and 29 and the mount 17 and on the corresponding contour of the support elements 28 and 29.

Each support element 28 and 29 is equipped with a sleeve-shaped support protrusion 26 and 30 which extends outward and more or less in the direction of the sliding motion or parallel to the protrusions 12 and 22 of the support 5. With the aid of these support protrusions 26 and 30 the support elements 28 and 29 support the protrusions 12 and 22 of the support 5; an elastic support or cushioning part 25, constructed as an O-ring, is inserted between the support protrusion 26 and the protrusion 12 of the support 5; and another elastic support or cushioning part 31, also constructed as an O-ring, is inserted between the support protrusion 30 and the protrusion 22 of the support 5. The contours of the protrusions 12 and 22 of the support 5 are adapted to the shape of the support parts 25 and 31 in order to assure an efficient transfer of the support forces. The support parts 25 and 31 are mounted in such a way that they support the outer end areas of the protrusions 12 and 22 of the support 5 under the effect of a predetermined prestress.

The sealing element 2 is equipped with two radial bores 32 and 33 which serve the purpose of connecting the spaces 6 between the sealing element 2 and the support 5 with the space contained between the sealing element 2 and the cylinder tube 8 and for bleeding the latter. This facilitates the formation of the differential pressure required for blocking the piston.

The device described up to now, according to FIG. 2, can be used to increase still further the pressure forces exerted on the sealing element 2 in the area of the sealing edges 1 and 7 of the sealing element 2 in order to make it possible to apply the device even with very high pressures, as those occurring in hydraulic systems, for example.

While two embodiments of the present invention have been described in detail above, it should be understood by those persons who are skilled in the sealing art that other adaptations and modifications can be made without departing from the spirit and scope of the attached claims.

We claim:

1. A sealing apparatus for sealing two longitudinal extending machine components which can slide relative to and against one another longitudinally, a first of such two machine components having a sliding surface along which a second of such two machine components slides longitudinally to define a sliding motion, said sealing apparatus comprising:
   (a) a plastic sealing element having low friction and relatively low elasticity secured to said second machine component;
   (b) an elastic support member positioned intermediate said plastic sealing element and said second machine component to exert a force on at least a portion of said plastic sealing element which slides along said sliding surface of said first machine component and to provide support for said plastic sealing element, said elastic support member having an elasticity in cross-section at least in a plane perpendicular to said sliding surface on said first machine component;
   (c) at least a portion of said plastic sealing element which slides along said sliding surface on said first machine component encircles said elastic support member in a direction of said sliding motion;
   (d) mounting protrusions integral with and extending from said plastic sealing element and extending in cross-section in a plane substantially perpendicular to said sliding surface on said first machine component to engage corresponding support surfaces of said elastic support member, said corresponding support surfaces are oriented in cross-section in a plane substantially perpendicular to said mounting protrusions;
   (e) an outer dimension of said corresponding support surfaces, measured in a direction of said sliding motion, is greater than a distance between said mounting protrusions of said plastic sealing element when said plastic sealing element and said elastic support member are in an unmounted condition;
   (f) said portion of said plastic sealing element, which slides along said sliding surface on said first machine component, includes a predetermined prestress exerted by said corresponding support surfaces on said mounting protrusions in the direction of said sliding motion of said sliding surface, on said first machine component at least in an area of said mounting protrusions; and
   (g) said elastic support member includes sleeve-shaped protrusions extending substantially in said direction of said sliding motion and carrying said plastic sealing element and an end of each sleeve-shaped protrusion forming a respective support surface of said elastic support member and said elastic suppport member further includes a means positioned to engage adjacent each end of said sleeve-shaped protrusions and said second machine component for providing elastic cushioning for said sleeve-shaped protrusions.

2. A sealing apparatus, according to claim 1, wherein said at least one sleeve-shaped protrusion of said elastic support member is formed from a relatively elastic material.

3. A sealing apparatus, according to claim 2, wherein said relatively elastic material is rubber.

4. A sealing apparatus, according to claim 3, wherein in a plane perpendicular to said sliding surface on said first machine component and in said direction of said sliding motion a cross-section of said elastic support member is T-shaped and each end of a portion representing a crossbar of said T form support surfaces of said elastic support member.

5. A sealing apparatus, according to claim 2, wherein in a plane perpendicular to said sliding surface on said first machine component and in said direction of said sliding motion a cross-section of said elastic support member is T-shaped and each end of a portion representing a crossbar of said T form support surfaces of said elastic support member.

6. A sealing apparatus, according to claim 1, wherein in a plane perpendicular to said sliding surface on said first machine component and in said direction of said sliding motion a cross-section of said elastic support member is T-shaped and each end of a portion representing a crossbar of said T form support surfaces of said elastic support member.

7. A sealing apparatus for sealing two longitudinal extending machine components which can slide relative to and against one another longitudinally, a first of such two machine components having a sliding surface along which a second of such two machine components slides longitudinally to define a sliding motion, said sealing apparatus comprising:
   (a) a plastic sealing element having low friction and relatively low elasticity secured to said second machine component;
   (b) an elastic support member positioned intermediate said plastic sealing element and said second machine component to exert a force on at least a portion of said plastic sealing element which slides along said sliding surface of said first machine component and to provide support for said plastic sealing element, said elastic support member having an elasticity in cross-section at least in a plane perpendicular to said sliding surface on said first machine component;

(c) at least a portion of said plastic sealing element which slides along said sliding surface on said first machine component encircles said elastic support member in a direction of said sliding motion;

(d) mounting protrusions integral with and extending in cross-section from said plastic sealing element and extending in a plane substantially perpendicular to said sliding surface on said first machine component to engage corresponding support surfaces of said elastic support member, said corresponding support surfaces are oriented in cross-section in a plane substantially perpendicular to said mounting protrusions;

(e) an outer dimension of said corresponding support surfaces, measured in a direction of said sliding motion, is greater than a distance between said mounting protrusions of said plastic sealing element when said plastic sealing element and said elastic support member are in an unmounted condition;

(f) said portion of said plastic sealing element, which slides along said sliding surface on said first machine component, includes a predetermined prestress exerted by said corresponding support surfaces on said mounting protrusions in the direction of said sliding motion of said sliding surface on said first machine component at least in an area of said mounting protrusions;

(g) said two machine components form a working cylinder, and said first of said two machine components is a cylinder, and said second of said two machine components is a piston carrying said elastic support member, and said portion of said plastic sealing element which slides along said sliding surface of said cylinder is part of a packing assembly secured to said piston; and (h) said elastic support member includes sleeve-shaped protrusions extending substantially in said direction of said sliding motion and carrying said plastic sealing element and an end of each sleeve-shaped protrusion forming a respective support surface of said elastic support member and said elastic support member further includes a means positioned to engage adjacent each end of said sleeve-shaped protrusions and said second machine component for providing elastic cushioning for said sleeve-shaped protrusions.

8. A sealing apparatus, according to claim 2, wherein in a plane perpendicular to said sliding surface on said first machine component and in said direction of said sliding motion a cross-section of said elastic support member is T-shaped and each end of a portion representing a crossbar of said T form support surfaces of said elastic support member.

9. A sealing apparatus, according to claim 8, wherein said at least one sleeve-shaped protrusion of said elastic support member is formed from a relatively elastic material.

10. A sealing apparatus, according to claim 9, wherein said relatively elastic material is rubber.

11. A sealing apparatus, according to claim 9, wherein in a plane vertical to said sliding surface on said first machine component and in said direction of said sliding motion a cross-section of said elastic support member is T-shaped and each end of a portion representing a crossbar of said T form support surfaces of said elastic support member.

12. A sealing apparatus, according to claim 7, wherein said sealing apparatus further includes:
(a) two rigid support elements secured to said piston to support end portions of said elastic support member having said support surfaces; and
(b) elastic support members positioned between said rigid support elements and said end portions of said elastic support member.

13. A sealing apparatus, according to claim 12, wherein said elastic support members are formed as rings.

14. A sealing apparatus, according to claim 13, wherein said rings are O-rings.

15. A sealing apparatus for sealing two longitudinal extending machine components which can slide relative to and against one another longitudinally, a first of such two machine components having a sliding surface along which a second of such two machine components slides longitudinally to define a sliding motion, said sealing apparatus comprising:

(a) a plastic sealing element having low friction and relatively low elasticity secured to said second machine component;

(b) an elastic support member positioned intermediate said plastic sealing element and said second machine component to exert a force on at least a portion of said plastic sealing element which slides along said sliding surface of said first machine component and to provide support for said plastic sealing element, said elastic support member having an elasticity in cross-section at least in a plane perpendicular to said sliding surface on said first machine component;

(c) at least a portion of said plastic sealing element which slides along said sliding surface on said first machine component encircles said elastic support member in a direction of said sliding motion;

(d) mounting protrusions integral with and extending from said plastic sealing element and extending in cross-section in a plane substantially perpendicular to said sliding surface on said first machine component to engage corresponding support surfaces of said elastic support member, said corresponding support surfaces are oriented in cross-section in a plane substantially perpendicular to said mounting protrusions;

(e) an outer dimension of said corresponding support surfaces, measured in a direction of said sliding motion, is greater than a distance between said mounting protrusions of said plastic sealing element when said plastic sealing element and said elastic support member are in an unmounted condition;

(f) said portion of said plastic sealing element, which slides along said sliding surface on said first machine component, includes a predetermined prestress exerted by said corresponding support surfaces on said mounting protrusions in the direction of said sliding motion of said sliding surface on said first machine component at least in an area of said mounting protrusions;

(g) in a plane perpendicular to said sliding surface on said first machine component and in said direction of said sliding motion a cross-section of said plastic sealing element is U-shaped and two side portions of said U-shaped plastic sealing element form said mounting protrusions; and (h) said elastic support member includes sleeve-shaped protrusions extending substantially in said direction of said sliding motion and carrying said plastic sealing element and an end of each sleeve-shaped protrusion forming a respective support surface of said elastic support member and said elastic suppport member further includes a means positioned to engage adjacent each end of said sleeve-shaped protrusions and said second machine component for providing elastic cushioning for said sleeve-shaped protrusions.

16. A sealing apparatus, according to claim 15, wherein said at least one sleeve-shaped protrusion of said elastic support member is formed from a relatively elastic material.

17. A sealing apparatus, according to claim 16, wherein in a plane perpendicular to said sliding surface on said first machine component and in said direction of said sliding motion a cross-section of said elastic support member is T-shaped and each end of a portion representing a crossbar of said T form support surfaces of said elastic support member.

18. A sealing apparatus, according to claim 16, wherein said relatively elastic material is rubber.

19. A sealing apparatus, according to claim 15, wherein in a plane perpendicular to said sliding surface on said first machine component and in said direction of said sliding motion a cross-section of said elastic support member is T-shaped and each end of a portion representing a crossbar of said T form support surfaces of said elastic support member.

20. A sealing apparatus for sealing two longitudinal extending machine components which can slide relative to and against one another longitudinally, a first of such two machine components having a sliding surface along which a second of such two machine components slides longitudinally to define a sliding motion, said sealing apparatus comprising:

(a) a plastic sealing element having low friction and relatively low elasticity secured to said second machine component;

(b) an elastic support member positioned intermediate said plastic sealing element and said second machine component to exert a force on at least a portion of said plastic sealing element which slides along said sliding surface of said first machine component and to provide support for said plastic sealing element, said elastic support member having an elasticity in cross-section at least in a plane perpendicular to said sliding surface on said first machine component;

(c) at least a portion of said plastic sealing element which slides along said sliding surface on said first machine component encircles said elastic support member in a direction of said sliding motion;

(d) mounting protrusions integral with and extending from said plastic sealing element and extending in cross-section in a plane substantially perpendicular to said sliding surface on said first machine component to engage corresponding support surfaces of said elastic support member, said corresponding support surfaces are oriented in cross-section in a plane substantially perpendicular to said mounting protrusions;

(e) an outer dimension of said corresponding support surfaces, measured in a direction of said sliding motion, is greater than a distance between said mounting protrusions of said plastic sealing element when said plastic sealing element and said elastic support member are in an unmounted condition;

(f) said portion of said plastic sealing element, which slides along said sliding surface on said first machine component, includes a predetermined prestress exerted by said corresponding support surfaces on said mounting protrusions in the direction of said sliding motion of said sliding surface on said first machine component at least in an area of said mounting protrusions;

(g) said two machine components form a working cylinder, and said first of said two machine components is a cylinder, and said second of said two machine components is a piston carrying said elastic support member, and said portion of said plastic sealing element which slides along said sliding surface of said cylinder is part of a packing assembly secured to said piston;

(h) in a plane perpendicular to said sliding surface on said first machine component and in said direction of said sliding motion a cross-section of said plastic sealing element is U-shaped and two side portions of said U-shaped plastic sealing element form said mounting protrusions; and (i) said elastic support member includes sleeve-shaped protrusions extending substantially in said direction of said sliding motion and carrying said plastic sealing element and an end of each sleeve-shaped protrusion forming a respective support surface of said elastic support member and said elastic support member further includes a means positioned to engage adjacent each end of said sleeve-shaped protrusions and said second machine component for providing elastic cushioning for said sleeve-shaped protrusions.

21. A sealing apparatus, according to claim 20, wherein said at least one sleeve-shaped protrusion of said elastic support member is formed from a relatively elastic material.

22. A sealing apparatus, according to claim 21, wherein said relatively elastic material is rubber.

23. A sealing apparatus, according to claim 21, wherein in a plane perpendicular to said sliding surface on said first machine component and in said direction of said sliding motion a cross-section of said elastic support member is T-shaped and each end of a portion representing a crossbar of said T form support surfaces of said elastic support member.

24. A sealing apparatus, according to claim 20, wherein in a plane perpendicular to said sliding surface on said first machine component and in said direction of said sliding motion a cross-section of said elastic support member is T-shaped and each end of a portion representing a crossbar of said T form support surfaces of said elastic support member.

* * * * *